US006726982B2

(12) United States Patent
Christian et al.

(10) Patent No.: US 6,726,982 B2
(45) Date of Patent: Apr. 27, 2004

(54) THERMAL TRANSFER COMPOSITIONS, ARTICLES, AND GRAPHIC ARTICLES MADE WITH SAME

(75) Inventors: Paul D. Christian, Apple Valley, MN (US); Nancy H. Phillips, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 474 days.

(21) Appl. No.: 09/757,521

(22) Filed: Jan. 9, 2001

(65) Prior Publication Data

US 2003/0044595 A1 Mar. 6, 2003

Related U.S. Application Data

(63) Continuation of application No. 08/686,223, filed on Jul. 25, 1996, now Pat. No. 6,200,666.

(51) Int. Cl.[7] .................. B32B 27/40; B32B 3/00; B44C 1/165; B41M 3/12
(52) U.S. Cl. .......... 428/195; 428/200; 428/207; 428/500; 428/913; 428/914; 428/915; 156/230; 156/240; 156/247; 156/277; 427/148; 430/250
(58) Field of Search .................... 156/230, 224, 156/234, 240, 247, 277, 289, 272.2, 275.5; 428/195, 200, 204, 207, 203, 202, 914, 915, 343, 213, 560, 913; 427/146, 147, 148; 430/250, 253

(56) References Cited

U.S. PATENT DOCUMENTS

| 3,712,706 A | 1/1973 | Stamm |
| 3,770,479 A | 11/1973 | Dunning |
| 3,775,113 A | 11/1973 | Bonham et al. |
| 3,834,925 A | 9/1974 | Matsumura et al. |
| 3,887,450 A | 6/1975 | Gilano et al. |
| 3,895,949 A | 7/1975 | Akamatsu et al. |

(List continued on next page.)

FOREIGN PATENT DOCUMENTS

| DE | 38 13 303 C1 | 7/1989 |
| EP | 0 143 135 | 6/1985 |
| EP | 0 445 570 A1 | 9/1991 |
| EP | 0 512 668 A2 | 11/1992 |
| EP | 0 555 069 A1 | 8/1993 |
| EP | 0 658 607 A1 | 6/1995 |
| GB | 1 218 058 | 1/1971 |
| GB | 1 466 469 | 3/1977 |
| GB | 1 604 250 | 12/1981 |
| GB | 2 261 221 | 5/1993 |
| WO | WO 94/08788 | 4/1994 |
| WO | WO 94/19769 | 9/1994 |

OTHER PUBLICATIONS

ASTM D 1238, "Standard Test Method for Flow Rates of Thermoplastics by Extrusion Plastometer".
Kosar, J., *Light Sensitive Systems*, Ch. 5, pp. 158–193, John Wiley & Sons, New York, NY (1965).

*Primary Examiner*—J. A. Lorengo
(74) *Attorney, Agent, or Firm*—Carolyn A. Fischer

(57) ABSTRACT

Thermal transfer articles of the invention comprising a carrier, optionally a release layer, a color layer releasably adhered thereto, and optionally an adherence layer on the bottom side of the color layer. Also graphic imaging compositions and methods for thermal transfer using such articles and compositions and graphic articles made by such methods. The transfer articles 1) exhibit thermoplastic, low cohesive properties during transfer such that good image resolution and transfer is achieved and 2) are radiation crosslinked after transfer such that a durable image is formed.

7 Claims, 2 Drawing Sheets

U.S. PATENT DOCUMENTS

| | | | |
|---|---|---|---|
| 3,953,635 A | | 4/1976 | Dunning |
| 4,025,159 A | | 5/1977 | McGrath |
| 4,084,032 A | | 4/1978 | Pasersky |
| 4,153,412 A | * | 5/1979 | Bailey .......................... 8/471 |
| 4,243,618 A | | 1/1981 | Van Arnam |
| 4,294,641 A | * | 10/1981 | Reed et al. ................. 156/234 |
| 4,349,598 A | | 9/1982 | White |
| 4,511,210 A | | 4/1985 | Tung et al. |
| 4,551,360 A | | 11/1985 | Kawajiri |
| 4,588,258 A | | 5/1986 | Hoopman |
| 4,664,966 A | | 5/1987 | Bailey et al. |
| 4,751,102 A | | 6/1988 | Adair et al. |
| 4,775,219 A | | 10/1988 | Appeldorn et al. |
| 4,786,537 A | | 11/1988 | Sasaki |
| 4,859,742 A | | 8/1989 | Pattein et al. |
| 4,895,428 A | | 1/1990 | Nelson et al. |
| 4,896,943 A | | 1/1990 | Tolliver et al. |
| 4,919,994 A | | 4/1990 | Incremons et al. |
| 4,983,436 A | | 1/1991 | Bailey et al. |
| 5,066,098 A | | 11/1991 | Kult et al. |
| 5,104,719 A | | 4/1992 | Kamen et al. |
| 5,232,527 A | * | 8/1993 | Vernhet et al. ................ 156/67 |
| 5,393,590 A | | 2/1995 | Caspari |
| 5,407,708 A | | 4/1995 | Lovin et al. |
| 5,460,918 A | | 10/1995 | Ali et al. |
| 5,468,532 A | | 11/1995 | Ho et al. |
| 5,494,774 A | | 2/1996 | Ali et al. |
| 5,712,035 A | | 1/1998 | Ohtaka |
| 5,747,217 A | | 5/1998 | Zaklika et al. |
| 5,819,661 A | | 10/1998 | Lewis et al. |
| 5,932,352 A | * | 8/1999 | Higgins ................... 428/423.1 |
| 6,200,666 B1 | * | 3/2001 | Christian et al. ........... 428/195 |

* cited by examiner

THERMAL TRANSFER COMPOSITIONS, ARTICLES, AND GRAPHIC ARTICLES MADE WITH SAME

This is a continuation of Ser. No. 08/686,223 filed Jul. 25, 1996 and now U.S. Pat. No. 6,200,666.

BACKGROUND OF THE INVENTION

1. Field of the Invention

This invention relates to compositions and articles suitable for use in thermal transfer imaging processes, and also relates to graphic articles comprising a graphic image formed using the inventive compositions and articles, and methods of making such graphic articles.

2. Related Art

Graphic articles, sometimes referred to as signage articles, are used in a wide variety of applications, both for informational and for decorative purposes. For example, retroreflective sheetings are an important medium used in manufacturing graphic articles such as license plates, road/street markings, validation stickers, and package labels. Decals are a medium used for automotive labels and decoration.

Images on graphic articles may be formed by thermal transfer of a color layer from a first substrate or carrier, usually a plastic film, to a second substrate surface, e.g., the retroreflective sheeting or a component thereof. Thermal transfer printing methods, such as hot stamp printing or thermal mass transfer printing, form an image by selective transfer of portions of the color layer from the first substrate to the second substrate. Images formed on graphic articles may be, for example, alphanumeric characters, bar codes, or graphics.

Alternatively, images may comprise preformed color layers on a decal, which are transferred by hot transfer lamination. It is known to form graphic patterns on substrates using transfer articles bearing predesignated designs. G.B. Patent No. 1,218,058 (Hurst et al.) discloses transfers with an adhesive layer applied to only those areas intended to be transferred to the substrate; U.S. Pat. Nos. 4,786,537 (Sasaki) and 4,919,994 (Incremona et al.) disclose transfer graphic articles wherein the graphic design is formed via imagewise differential properties within the transfer film itself. One problem with such approaches is that a large and varied inventory must be maintained in order to provide a variety of graphic patterns.

Formation of desired graphic images from continuous layers via thermal transfer processes is also well known. For example, thermal mass transfer articles, typically comprising a carrier, optionally a release layer, and a transferable color layer have been known for some time. The article is contacted to a desired substrate such that the color layer is in contact with the substrate and heat is applied in imagewise fashion to cause imagewise portions of the color layer to release from the carrier and adhere to the substrate.

Hot stamping foils comprising a carrier, one or more color layers, and an adherence layer have also been known for some time. Such films have been used to provide imagewise graphic patterns, e.g., alphanumeric or decorative legends, to substrates via imagewise application of heat and/or contact or pressure. In some embodiments, additional members such as release layers are used to facilitate desired performance. In some embodiments, so-called "texture layers" and/or "ticks", metal layers, etc. are used as well to yield desired appearance. Hot stamping foils are also sometimes called hot-stamp tapes or thermal transfer tapes.

The color layer(s), adherence layer, and any other layers that are selectively applied to the substrate should split or fracture in desired manner in order for the applied graphic pattern to have a desired edge appearance. Some illustrative examples of previously known hot stamping foils are disclosed in U.S. Pat. Nos. 3,770,479 (Dunning) 3,953,635 (Dunning), and 4,084,032 (Pasersky). It has also been known to transfer graphic patterns using means in addition to or other than heat to achieve imagewise separation of imaging material from a carrier and adhesion to a substrate. For example, U.S. Pat. No. 3,834,925 (Matsumura et al.) discloses a transfer material that utilizes solvent action to achieve imagewise deposition.

An advantage of the foregoing techniques is that the transfer film may be made as a uniform sheet, i.e., with no specific latent image embodied therein. The applicator defines the graphic pattern by controlling the application process, e.g., imagewise application of heat and/or contact or pressure permits maintenance of a smaller inventory of thermal transfer element material.

One well known use of hot stamping foils is to print legends on vehicle identification plates. For example, license plates produced using hot stamping foils have been used in Austria, Australia, Finland, Germany, Ireland, Portugal, and Switzerland. One commercially available hot stamping foil currently used on license plates with polyvinyl chloride cover films is believed to comprise a polyester carrier, about 28 microns thick; a color layer based on acrylic resins such as polymethyl methacrylate and containing carbon black pigments, about 5 microns thick; and an acrylate-based adherence layer, about 5 microns thick. Examples of resins that are believed to have been used in adherence layers include polyvinyl alcohol copolymers, nitrocellulose, and methyl methacrylate/butyl methacrylate copolymers.

Recently improved retroreflective sheetings have been made available which have cover films made of olefin-based materials or polyurethane-based materials to improve certain performance. As disclosed in the aforementioned U.S. Pat. No. 4,896,943 (Tolliver et al.), olefin-based cover films, e.g., ethylene/acrylic acid copolymers, can provide superior properties including abrasion and dirt resistance. Many conventional hot stamping foils do not achieve good adherence to such cover sheets, however, resulting in graphic patterns having unsatisfactory durability and performance.

More recently, U.S. Pat. No. 5,393,950 (Caspari) discloses hot stamping foils well suited for use on retroreflective articles wherein the foils comprise a carrier, optionally a release control layer, a color layer, and an adherence layer wherein the adherence layer comprises, and may consist essentially of, a mixture of an ethylene copolymer dispersion and an acrylic dispersion.

Graphic articles having images formed by thermal transfer normally provide satisfactory print quality, legibility, and adhesion. However, many presently known thermal transfer color layer formulations are compatible with only a limited class of retroreflective sheeting layers, primarily those layers comprising polyvinyl chloride (PVC), acrylics and polyurethanes. Sheetings having polyvinyl butyral, ethylene/acrylic acid copolymer, or melamine/alkyd copolymer surface layers may be difficult to print upon by known thermal transfer methods. Furthermore, PVC is not environmentally desirable.

Retroreflective articles are typically provided with cover films (e.g., made of polymethylmethacrylate (PMMA), plasticized PVC, alkyd resins, acrylic resins, and the like) to improve retroreflective performance under wet conditions and to protect the retroreflective elements.

To provide improved durability, embossability, and abrasion resistance, improved retroreflective sheetings with substantially thermoplastic cover films were developed, for example aliphatic polyurethanes and ethylene/acrylic acid copolymers, that latter including ionomers. One of the problems with the newer substantially thermoplastic cover film materials is that in order to achieve satisfactory adhesion of thermal transfer color layers to such films, chemical and/or physical priming of the cover film may be needed. For example, U.S. Pat. No. 5,393,590 (Caspari) discloses a hot stamp foil having a novel adherence layer over the color layer that permits effective thermal transfer printing upon polyolefin- or polyurethane-based surfaces.

Color layers of hot stamp foils and thermal transfer ribbons generally have low cohesive strength, which promotes efficient and desired imagewise transfer of color layer material from the first substrate to the second substrate surface during thermal transfer. However, images formed from such color layers should exhibit sufficient durability for many end uses. To improve the durability of the image, a protective layer often is formed thereover, e.g., by incorporating a cover layer in a hot stamp foil to be transferred along with the color layer, or by applying a clear coat over the transferred color layer.

U.S. Pat. No. 5,468,532 (Ho et al.), and a continuation-in-part thereof, U.S. patent application Ser. No. 08/506,926, filed Jul. 26, 1995, (Phillips), now pending, both incorporated herein by reference, disclose multilayer graphic articles comprising a substrate, a color layer disposed on the substrate, and a transparent, protective layer that overlies both the color layer and the substrate. The color layer is formed from ink formulations comprising a color agent and a copolymeric binder formed from the copolymerization product of an olefinic monomer and a second monomer having a pendant carboxyl group. The binder may be crosslinked through an ionic bond, a covalent bond, etc. In each case where the binder is crosslinked, carboxylic acid groups pendant from the copolymeric binder participate in the crosslinking reaction.

Although the above work is impressive, there still exists a need for thermoplastic thermal transfer compositions and thermal transfer articles that allow the thermoplastic composition to be readily and easily applied to a variety of substrates without using chemical and/or physical priming of the substrate, and which produce durable, weatherable images. Durability and weatherability of the compositions after being transferred to the substrate, with or without a cover layer, is also a primary goal.

SUMMARY OF THE INVENTION

In accordance with the present invention, thermal transfer compositions and articles are presented which overcome many of the problems encountered with known compositions and articles. Thermal transfer articles of the invention comprise a carrier, optionally a release layer, a color layer releasably adhered thereto, and optionally an adherence layer on the bottom side of said color layer. Articles of the invention can be in the form of mass thermal transfer ribbons or hot stamp foils. The invention also provides novel graphic articles and methods for making same.

Unlike previously known thermal transfer articles, the articles of the invention 1) exhibit thermoplastic, low cohesive properties during transfer such that good image resolution and transfer is achieved; and 2) are subsequently radiation crosslinked such that a durable image is formed. The novel combination of thermal transfer of a thermoplastic material and subsequent radiation crosslinking disclosed herein is unobvious and provides previously unattained performance advantages.

The invention also provides a thermal transfer imaging process using thermal transfer elements, sometimes referred to as donor elements, of the invention. The invention also provides graphic articles bearing images formed via the method of the invention. In accordance with the process and materials of the invention convenient generation of desired images that are durable is readily attained.

One aspect of the invention is a coatable, radiation-crosslinkable thermoplastic composition. An illustrative example of such a composition is:

a) a dispersion of copolymer with the general formula:

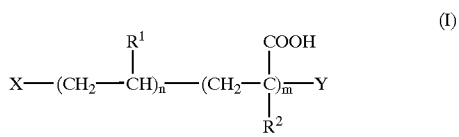

(I)

wherein $R^1$ is selected from the group consisting of H and alkyl groups containing one to eight carbon atoms; $R^2$ is selected from the group consisting of H, alkyl groups containing one to six carbon atoms, —CN, ester groups and $R^3$—COOH, wherein $R^3$ is any alkyl group, e.g., containing one to eight carbon atoms; X and Y are independently selected from the group consisting of a residue of the first ethylenically unsaturated monomer and a residue of the second ethylenically unsaturated monomer; n is a positive integer selected such that the first ethylenically unsaturated monomer provides from about 70 to 99 mole percent (48 to 97 weight percent) of the copolymer; and m is a positive integer selected such that the second ethylenically unsaturated monomer correspondingly provides from about 1 to 30 mole-percent (2 to 52 weight percent) of the copolymer (which is sometimes referred to hereinafter as Component A);

b) a crosslinkable polyurethane comprising a plurality of pendant ethylenically unsaturated moieties (the polyurethane is sometimes referred to hereinafter as Component B); and c) a colorant. Various combinations of such materials may be used to advantageous effect.

Compositions of the invention typically include a photoinitiator, e.g., an ultraviolet light photoinitiator. The copolymer optionally comprises an ethylene copolymer, more preferably ethylene/acrylic acid copolymer.

Preferably, the composition is suitable for forming a covalently crosslinked, substantially thermoset, durable and weatherable (as defined herein) graphic image on a substrate surface. The substrate may comprise, for example, polyvinyl butyral, melamine alkyd/urethane, polymethylmethacrylate, polyvinyl chloride, polyurethane and ethylene copolymers (such as extruded ethylene/acrylic acid copolymers, ionomers, and the like). Materials such as ethylene/acrylic acid copolymers are typically difficult to durably adhere to.

As used herein the terms durable and durability refer to characteristics such as solvent and chemical resistance, abrasion resistance, bond maintenance of the solid residue of the inventive composition to the substrate, and maintenance of color brightness (and for retroreflective substrates, retroreflective brightness). The terms weatherable and weatherability refer to the characteristics such as maintenance of retroreflective brightness, resistance to dirt, resistance to yellowing and the like, all of these in normal use conditions in the outdoors, where sunlight, temperature, and other environmental parameters may affect performance.

Crosslinking is typically activated by actinic irradiation of the photoinitiator after the graphic image is formed, preferably with ultraviolet light. Useful actinic radiation typically has an energy dosage ranging from about 150 to about 400 milliJoules/centimeter$^2$ of substrate surface. The crosslinking can be also be induced by exposing the material to be crosslinked to an electron beam. As used herein, the term radiation refers to any form of energy that causes the crosslinking reaction, including actinic radiation and electron beam exposure.

Another aspect of the invention is a first graphic article comprising:
- a) a substrate having a polymeric surface layer referred to here as an image receiving layer; and
- b) a graphic layer adhered to at least a portion of the image receiving layer, the graphic layer comprising an effective amount of a colorant and a crosslinked binder, the binder derived from the crosslinkable composition of the invention. The graphic layer may be imagewise and discontinuous, or the graphic layer may be a substantially uniform, continuous layer.

Preferred image receiving layers comprise materials previously mentioned as suitable substrate surfaces. Preferred articles of the invention are retroreflective through inclusion in the substrate of retroreflective elements. The articles may further comprise a cover film overlying the graphic image and the image receiving layer if desired.

Another aspect of the invention is a second graphic article comprising:
- a) a substrate having a polymeric surface layer referred to here as an image receiving layer; and
- b) a graphic layer adhered to at least a portion of the image receiving layer, the graphic layer comprising:
  - i) a primer layer adhered to at least a portion of the image receiving layer, the primer layer comprising a first crosslinkable binder; and
  - ii) a colorant layer adhered to the primer layer, the colorant layer comprising a colorant and a second covalently crosslinked binder which is at least partially covalently crosslinked with the first crosslinkable binder layer.

Another aspect of the invention is a first method of forming a graphic article, the method comprising the steps of:
- a) providing a substrate having an exposed polymeric surface layer referred to here as an image receiving layer;
- b) providing a thermal transfer article effective for forming a graphic image on the image receiving layer, the thermal transfer article comprising a removable carrier having first and second major surfaces and a colorant layer on one of the major surfaces, the colorant layer comprising a solid residue of a coatable, crosslinkable thermoplastic composition;
- c) contacting the colorant layer to the image receiving layer of the substrate;
- d) forming the graphic image by thermally transferring at least a portion of the colorant layer to the image receiving layer to yield a graphic article precursor;
- e) removing the carrier from the graphic article precursor; and
- f) crosslinking the graphic image (e.g., by exposure to actinic radiation).

Another aspect of the invention is a second method of forming a graphic article, the method comprising the steps of:
- a) providing a substrate having a surface layer referred to here as an image receiving layer;
- b) coating a primer layer onto the image receiving layer, the primer layer comprising a polymer such as an urethane, an acrylic or a blend of urethane and acrylic, with such polymer having a plurality of pendant ethylenically unsaturated moieties;
- c) drying the product of step b) to remove substantially all moisture;
- d) applying a radiation crosslinkable composition of the invention to the product of step c); and
- e) exposing the product of step d) to radiation sufficient to crosslink the radiation-crosslinkable composition.

The primer layer may be applied in either an imagewise, discontinuous manner, or in a substantially uniform, continuous layer.

Illustrative methods within these aspects of the invention are those wherein the substrate comprises retroreflective elements, and wherein the substrate comprises an ethylene copolymer cover layer onto which the graphic image is formed.

BRIEF DESCRIPTION OF THE DRAWING

The invention will be further explained with reference to the drawing, wherein.

These Figures are intended to be merely illustrative, are not to scale, and are non-limiting.

DESCRIPTION OF ILLUSTRATIVE EMBODIMENTS

Room temperature (about 20° C.) solid thermal transfer imaging compositions of the invention (i.e., those that are adhered to a thermal transfer carrier or to the image receiving layer of a graphic article) comprise a radiation crosslinkable thermoplastic binder and a colorant. The crosslinking may be achieved after thermal transfer of the composition to the receptive substrate in the case of thermal transfer printing methods. Prior to thermal transfer, imaging compositions of the invention display thermoplastic properties desirable for effective transfer to a receptive substrate. Thereafter, radiation energy is utilized to crosslink the thermoplastic binder, thereby increasing the cohesive strength of the imaging composition, and providing durability, weatherability and chemical resistance to images formed by the composition.

Figure 1:
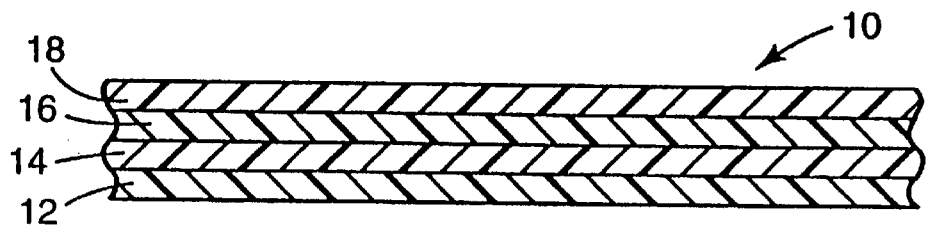
FIG. 1 is a schematic cross-sectional view of an illustrative thermal transfer article of the invention.

An embodiment of a thermal transfer article in accordance with the invention is illustrated as part of a hot stamp foil in FIG. 1. Hot stamp foil 10 comprises solid thermoplastic imaging composition layer 12, antistick layer 18, carrier 16, and release control layer 14. Imaging composition layer 12 comprises a colorant, a crosslinkable polyurethane, and a copolymer within general formula (I). Imaging composition layer 12 is illustrated in FIG. 1 disposed on releasable carrier 14. Release control layer 14 is an optional part of foil 10, as is antistick layer 18. In some instances an optional release liner (not shown) may be provided over color layer 12 to protect same during handling, etc.

Figure 2:
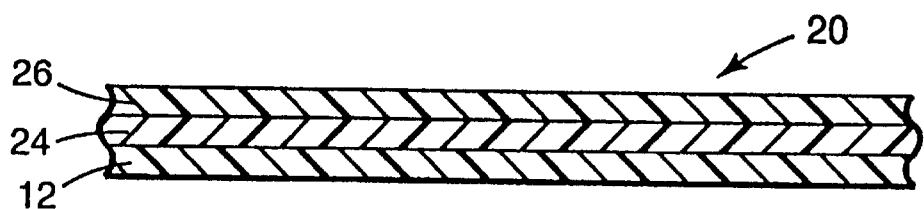
FIG. 2 is a schematic cross-sectional view of another illustrative thermal transfer article of the invention.

Another embodiment of a thermal transfer article in accordance with the invention is illustrated as part of a thermal mass transfer ribbon in FIG. 2. Ribbon 20 comprises imaging composition layer 12 (as described with reference to the embodiment of FIG. 1), releasable carrier 24, and optional heat resistant layer 26.

As illustrated in FIGS. 1 and 2, a thermal transfer imaging composition layer can be releasably supported upon a carrier prior to thermal transfer to a substrate. The carrier serves as a support for coating or forming an imaging composition layer, and allows the imaging composition layer to be stored, e.g., as a roll or a sheet. A removable carrier may be, for example, a polymeric film (such as biaxially-oriented polyethyleneterephthalate (PET) film) or a paper or metal carrier. The removable carrier must support the imaging composition layer yet allow transfer of the imaging composition layer from the carrier to a receptive substrate by thermal transfer printing. Optionally, a release control layer may be interposed between the removable carrier and color layer in order to effect efficient removal of color layer from the carrier.

In a preferred embodiment an anti-stick/release coating is applied to the back side of the thermal transfer articles (i.e., the side opposite the thermally transferable colorant layer) to improve handling characteristics of the articles, reduce friction, and prevent the thermal transfer article from sticking to the print substrate. Suitable anti-stick/release materials include, but are not limited to, silicone materials including poly(lower alkyl)siloxanes such as polydimethylsiloxane and silicone-urea copolymers, and perfluorinated compounds such as perfluoropolyethers.

Thermal transfer articles of the invention are typically wound into roll form for shipping and handling and are typically sufficiently flexible to be wound around a 2.5 centimeter (1 inch) diameter core without cracking or breaking. In many instances, foils of the invention will be used to apply graphics to substantially planar surfaces, but if appropriate application equipment is used they can also be used to apply graphics to non-planar substrates.

Solid residues of the imaging compositions of the invention generally have thermoplastic properties at room temperature. The thermoplastic properties of the solid residues are provided to a large extent by the properties of the thermoplastic resins present in the compositions.

Resin materials useful in the invention are sufficiently thermoplastic as solids that the residue of the inventive imaging composition, when temporarily adhered to a carrier, can be transferred to a receptive substrate under typical thermal transfer conditions. Thermoplastic resins also serve to secure colorant (preferably having color other than black, although black is included) to the receptive substrate surface after thermal transfer. For instance, thermoplastic materials that soften sufficiently to flow under minimal shear force at about 25° C. or more, but which remain adhered to the receptive substrate surface for long periods of time (at least 1 month, preferably at least 1 year, more preferably longer than 5 years) at temperatures below about 65° C. are preferred. Images having these characteristics, and which are also resistant to chemical attack and yellowing are useful for outdoor applications and therefore are referred to as durable, weatherable images.

Although thermoplastic materials useful in the invention are thermoplastic prior to thermal transfer, they can be latently crosslinked (after thermal transfer) to reach a substantially thermoset state. Thermoplastic resins that soften sufficiently to flow under shear at lower temperatures typically tend to be less durable than binders having higher softening temperatures. However, lower softening temperature thermoplastic resins may be used in imaging compositions to accomplish more efficient thermal transfer. These lower softening temperature resins may then be latently crosslinked after thermal transfer so that the crosslinked material does not soften substantially under probable environmental conditions to which a transferred imaging composition will be subjected, for example in outdoor signs, license plates, and the like.

One illustrative class of compositions suitable for use in the invention comprise:
(a) copolymers of a first ethylenically unsaturated monomer and a second ethylenically unsaturated monomer containing a pendant carboxyl group;
(b) polyurethanes comprising a plurality of pendant ethylenically unsaturated moieties; and
(c) a colorant.

Copolymers within (a) that are useful herein have general formula (I):

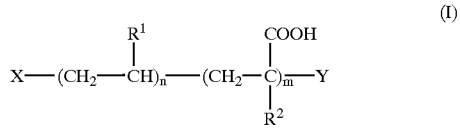

wherein $R^1$ is selected from the group consisting of H and alkyl groups containing one to eight carbon atoms; $R^2$ is selected from the group consisting of H, alkyl groups containing one to six carbon atoms, —CN, an ester group, and $R^3$—COOH, wherein $R^3$ is any alkyl group, e.g., containing one to eight carbon atoms; X and Y are independently selected from the group consisting of a residue of the first ethylenically unsaturated monomer and a residue of the second ethylenically unsaturated monomer; n is a positive integer selected such that the first ethylenically unsaturated monomer provides from about 70 to 99 mole percent (48 to 97 weight percent) of the copolymer; and m is a positive integer selected such that the second ethylenically unsaturated monomer correspondingly provides from about 1 to 30 mole-percent (2 to 52 weight percent) of the copolymer.

Illustrative examples of such copolymers are copolymers of ethylene and acrylic acid, and copolymers of ethylene and methacrylic acid. In these materials, the ethylene monomer preferably provides from about 91 to 97 mol-percent (79 to 93 weight percent) of the copolymer while the acrylic acid or methacrylic acid monomer (as the case may be) correspondingly provides from about 3 to 9 mol-percent (7 to 21 weight percent).

Generally, copolymers having a melt index (measured according to ASTM D 1238) between about 50 and 2000 will be preferred, with those having a melt index between about 50 and 1500 being more preferred. If the melt index is too high, the thermoplastic composition may tend to be too soft, have reduced temperature resistance, and be subject to undesirable creep. If the melt index is too low, the thermoplastic composition may be too stiff and may not form a good bond to receptive substrate surfaces to which graphics are applied.

Commercially available aqueous dispersions comprising copolymers within general formula (I) include those compositions known under the trade designations ADCOTE™-50T4983 (a composition wherein the copolymer comprises approximately 20 weight percent (9 mol-percent) acrylic acid and a melt index of 300), ADCOTE™-50T4990 (a composition wherein the copolymer comprises approximately 20 weight percent (9 mol-percent) acrylic acid and a melt index of 1300), and ADCOTE™-56220 (a composition wherein the copolymer comprises about 13 weight percent (7.5 mol-percent) methacrylic acid and a melt index of 60). Each of these materials is available from Morton International. Also useful is the copolymer known under the trade designation MICA™ G-927 (a composition wherein the copolymer comprises about 20 weight percent acrylic acid (9 mol-percent) and a melt index of 300), available from Mica Corp.

Ethylene acrylic acid copolymers and ethylene methacrylic acid copolymers are typically provided as a salt in which the carboxylic acid functionality has been neutralized with a base so as to improve the aqueous dispersibility of the resin. Consequently, it will be understood that copolymers within general formula (I) above include basic salts thereof. Useful bases for neutralizing the carboxylic acid functionality include ammonia and other amines. Sodium hydroxide and potassium hydroxide may also be used but are less preferred due to concerns of moisture sensitivity and non-evaporation of the metal ion.

Acrylic polymers (i.e., polymers having no olefinic comonomer) may also be used in compositions of the invention. Acrylic emulsions such as that known under the trade designation NEOCRYL™ A-612 (from Zeneca Resins, containing about 32 weight percent solids, 28.9 volume percent solids, about 54 weight percent water, and about 13.8 weight percent volatile organic compounds) are preferred. Other illustrative acrylic emulsions include those known under the trade designations NEOCRYL™ A-601 and A-614. The emulsions preferably do not contain polystyrene. Thermoplastic compositions comprising styrenated emulsions generally do not weather as well as those emulsions that are not styrenated.

In the present invention, aqueous compositions are particularly preferred although solvent-borne dispersions may be employed.

Terpolymers, for example of ethylene, methacrylic acid, and acrylic acid, are also considered within the scope of the invention. If terpolymers are employed, the monomers not containing the carboxyl group may be present at molar ratios ranging from about 1:10 to 10:1.

Polyurethanes having a plurality of pendant ethylenically unsaturated moieties (alternatively referred to herein as acrylated urethanes) are the second important component of the composition of the invention. A major portion of the total of Component A and Component B (i.e., 50 weight percent or greater) of an acrylated urethane is preferred to achieve adequate crosslinking upon exposure to actinic radiation energy, making the compositions especially useful for printing onto ethylene acrylic acid substrates. Acrylated urethanes are preferably available as aqueous dispersions. Commercially available preferred radiation-crosslinkable, aqueous dispersions of acrylated polyurethanes include those known under the trade designations NEORAD™ NR-3709 and NEORAD™ NR-440 (Zeneca Resins, Wilmington, Mass.). Particularly preferred is NEORAD™ NR-440, an aliphatic acrylated urethane dispersion.

Compositions within the invention may comprise varying weight percentages of an above mentioned copolymer within the general formula (I) (Component A) and an acrylated urethane (Component B). The proportion of Component B to Component A may be adjusted in order to achieve a desired combination of transfer efficiency, hardness, tensile strength, heat resistance, and/or environmental weather resistance of the crosslinked image composition. Radiation crosslinkable acrylated urethane may be present at weight percentages of at least about 50 weight percent of the total of Component A and Component B to provide adequate crosslinking upon exposure to radiation. The acrylic portion of the composition can be present at weight percentages of at least 10 weight percent, but no more than about 50 weight percent, to provide improved adhesion to ethylene acrylic acid type substrates for the coatings to be classified as both durable and weatherable, as those terms are used herein for outdoor use graphic articles. Preferably, the copolymer comprises between 5 and 45 percent by weight of the total composition, and the acrylated urethane comprises between 50 and 90 percent by weight. Most preferably, the copolymer comprises between 10 and 20 percent by weight of the total composition, and the acrylated urethane comprises between 70 and 80 percent by weight. These compositions may be used to make thermal transfer articles within the invention, and the thermal transfer articles subsequently used to produce inventive graphic articles.

Compositions of the invention further comprise one or more coloring agents such as organic or inorganic pigments or dyes, including white, black, and colored materials. If desired, the color agents may be fluorescent. Carbon black is a suitable inorganic pigment, as well as titanium dioxide ($TiO_2$).

Typically to be useful in a retroreflective application, the color layer should be transparent so the color is similar when viewed under either ordinary diffuse light conditions (e.g., under daylight) or under retroreflective conditions (e.g., at night time when illuminated by vehicle headlights). This typically requires pigments with a relatively narrow absorption band to yield a saturated color and pigment particles with an average refractive index of about 1.5 and an average diameter less than 1 micron in order to minimize light scattering. It will be understood by those skilled in the art that pigment particles outside this range may be used with satisfactory results in some instances. It is also preferred that the particle have an index of refraction that is close to that of the surrounding matrix so as to make any discontinuity less visible. It is especially preferred when organic pigments are used that such pigments be of small particle size so as to minimize light scattering as light passes through the color layer. Dyes also reduce light scattering but generally exhibit a greater tendency to migrate in these materials and therefore are more suitable for applications with shorter lifetimes.

Pigments can be made dispersible in an aqueous system by milling the particles with a water dispersible polymeric binder or by milling and surface treating the particle with suitable polymeric surfactant. Pigments exhibiting the desired properties have been obtained using both types of dispersing systems.

Examples of suitable commercially available waterborne pigment dispersions include HEUCOSPERSE III™ Organic Pigments, believed to contain about 25 weight percent pigment, 25 weight percent styrenated acrylic as binder, and 50 weight percent water, from Heucotech, Ltd.; AQUIS II™ Organic Pigment, believed to contain about 45 weight percent pigment, 5 weight percent surfactant, and 50 weight percent water, from Heucotech, Ltd.; and SUNSPERSE 6000™ Organic Pigment Dispersions, believed to typically contain about 45 weight percent pigment, 5 weight percent surfactant, and 50 weight percent water, from Sun Chemical Company.

Illustrative examples of suitable organic pigments include phthalocyanines, anthraquinones, perylenes, carbazoles, monoazo- and diazobenzimidazolone, isoindolinones, monoazonaphthol, diarylidepyrazolone, rhodamine, indigoid, quinacridone, disazopyranthrone, dinitraniline, pyrazolone, dianisidine, pyranthrone, tetrachloroisoindolinone, dioxazine, monoazoacrylide, anthrapyrimidine. It will be recognized by those skilled in the art that organic pigments may be differently shaded, or even differently colored, depending on the functional groups attached to the main molecule. However, many of the listed organic pigments have exhibited good weatherability in simulated outdoor use in that they retain much of their initial brightness and color, as exemplified herein below.

Commercial examples of useful organic pigments include those known under the trade designations PB 1, PB 15, PB 15:1, PB 15:2, PB 15:3, PB 15:4, PB 15:6, PB 16, PB 24, and PB 60 (blue pigments); PB 5, PB 23, and PB 25 (brown pigments); PY 3, PY 14, PY 16, PY 17, PY 24, PY 65, PY 73, PY 74, PY 83, PY 95, PY 97, PY 108, PY 109, PY 110, PY 113, PY 128, PY 129, PY 138, PY 139, PY 150, PY 154, PY 156, and PY 175 (yellow pigments); PG 1, PG 7, PG 10, and PG 36 (green pigments); PO 5, PO 15, PO 16, PO 31, PO 34, PO 36, PO 43, PO 48, PO 51, PO 60, and PO 61 (orange pigments); PR 4, PR 5, PR 7, PR 9, PR 22, PR 23, PR 48, PR 48:2, PR 49, PR 112, PR 122, PR 123, PR149, PR 166, PR 168, PR 170, PR 177, PR 179, PR 190, PR 202, PR 206, PR 207, and PR 224 (red); PV 19, PV 23, PV 37, PV 32, and PV 42 (violet pigments); and PBLACK (black), several of which are available from Heucotech, Fairless Hills, Pa. as aqueous dispersions under the trade designation AQUIS II™. Other useful commercially available aqueous pigment dispersions include those known under the trade designations AQUALOR™ (available from Penn Color Inc., Doylestown, Pa.; MICORLITH-WA™ (available from CIBA-GEIGY Corporation, Pigments Division, Oak Brook, Ill.); SUNSPERSE™, FLEXIVERSE™, and AQUATONE™ (available from Sun Chemical Corporation, Dispersions Division, Amelia, Ohio; and HEUCOSPERSE III™ (available from Heucotech LTD, Fairless Hills, Pa.).

Pigments typically are considered to be suitable for outdoor uses. The proportion of colorant and the thickness of an imaging composition layer may be varied to achieve the color intensity desired in the end use of the inventive imaging composition.

It has been observed that with surfactant dispersed organic pigments, very high amounts of pigment (e.g., up to the critical pigment volume concentration) can typically be used. In comparison, in some instances such as on polyvinyl butyral substrates, pigments dispersed in styrenated acrylic polymer may result in reduced adhesion of the color layer to the substrate when used at high pigment loading levels.

Other optional additives which can be incorporated into the color layer include cosolvents, surfactants, defoamers, antioxidants, light stabilizers, e.g., hindered amine light stabilizers, ultraviolet light absorbers, biocides, etc. Surfactants can improve the dispersibility of the color agents in the composition, and can improve the coatability of the color layer.

In some instances, it is desirable for an image to be transparent. For example, colorants other than black preferably impart a transparent color to images formed on retroreflective sheeting substrates.

The formation of a visibly homogenous blend (the blend appears homogeneous and uniform to the eye) is important, as visibly non-homogenous polymer blends will not form a continuously transparent film as is necessary for the representation of retroreflective colors. High transparency is attained by maintaining similarity between the refractive indexes of all components of the composition of the invention. In an aqueous system, water is the primary component and will hydrogen bond to the carboxylate groups, bringing them to the outside of the dispersed polymer particle. The externalized carboxylate groups are then able to associate with other polymer particles, preferably by covalent bonding interactions.

Factors that affect the thermal transfer efficiency of a colorant/binder composition from a hot stamp foil or thermal transfer ribbon include the adhesion to the removable carrier surface and to the substrate surface, thickness of the imaging composition layer, temperature at which thermal transfer takes place, composition of the receptive substrate surface, and the proportions of colorant, binder and/or filler present in the imaging composition. Imaging compositions generally are formulated to have a sufficiently low cohesive strength to achieve efficient transfer to a receptive substrate. The cohesive strength of an imaging composition is affected by the proportion of filler, the particular binder present in the composition and the temperature at which thermal transfer takes place.

Application of the imaging composition layer to the receptive substrate surface may be by any suitable application process.

Crosslinking is typically activated by actinic radiation, and preferably follows a free-radical addition polymerization method. Crosslinking comprises use of ethylenically unsaturated moieties which are activated by the free radicals present to form chemical bonds with each other. The necessary free radicals can be produced by irradiating with ultraviolet (UV) or visible light in the presence of an appropriate photoinitiator compound, with or without the use of a sensitizing compound; the photoinitiator preferably absorbs UV radiation at wavelengths of about 200 nanometers (nm) to about 400 nm.

Examples of preferred photoinitiators are organic peroxides, azo compounds, acyl halides, hydrazones, mercapto compounds, pyrylium compounds, triacylimidazoles, bisimidazoles, chloroalkyltriazines, benzoin ethers, benzil ketals, thioxanthones, and acetophenone derivatives. Additional references to free-radical photoinitiator systems for ethylenically-unsaturated compounds are described in U.S. Pat. Nos. 3,887,450, 3,895,949, and 3,775,113; and in "Light Sensitive Systems", by J. Kosar, J. Wiley and Sons, Inc. (1965), especially Chapter 5. One preferred photoinitiator is that known under the trade designation DAROCUR™ 1173 (2-hydroxy-2-methyl-1-phenylpropan-1-one), available from Ciba-Geigy, Ardsley, N.Y.

Color layers of transfer elements of the invention may also be crosslinkable by means such as electron beam. For the purposes of this invention, the term radiation is defined to include any form of energy that causes the crosslinking reaction of the acrylated urethane functionality, including actinic radiation and electron beam exposure.

Since crosslinking of the composition of the invention is typically activated by irradiation with ultraviolet or visible light, the composition should be protected from such forms of light until crosslinking is desired, for example after the composition has been coated onto a carrier which has then been contacted with an appropriate receptive substrate. If the crosslinking does begin during image transfer it preferably does not progress to such a degree as to undesirably interfere with release from the carrier, adhesion to the substrate, or cohesive splitting of the layer on the carrier to form the image with desired resolution.

Compositions of the invention may optionally comprise components such as hindered amine light stabilizers, ultraviolet light absorbers, surfactants, defoamers, biocides, cosolvents and the like. Thermal transfer articles of the invention may be formed by coating a composition of the invention, using any suitable coating method, e.g., gravure, roll coating, or knife coating, onto a carrier support and drying the mixture at room temperature. A suitable carrier for many applications is a polyethylene terephthalate (PET) film, generally from about 2 to about 50 micrometers in thickness. For example, a ribbon suitable for forming graphic images by thermal mass transfer printing may comprise a layer of the imaging composition of the invention about 2 to 50 micrometers thick removably secured to a PET film about 5 micrometers thick.

As used herein, an image receiving layer is any substrate upon which it is desired to form an image using a composition of the invention. A suitable substrate has a surface to which the composition can adhere. A substrate surface may be a polymeric layer such as polymethylmethacrylate (PMMA), ethylene copolymer, polyvinyl chloride (PVC), or a material such as cloth.

A receptive substrate may have underlying materials or layers, provided that the substrate has a suitable image receiving layer. For example, a substrate may be a sheeting comprising retroreflective elements, such as an embedded lens, encapsulated-lens (e.g., microsphere type or cube-corner retroreflective sheeting), or may be a component to be incorporated into such a sheeting.

In each of the graphic article embodiments illustrated, a graphic pattern is provided in the "effective optical path" of the retroreflective base sheet. As described above, the base sheet may be an optically complete retroreflective construction, i.e., a sheet of high intensity sheeting, or may be an optically incomplete construction that needs an additional component in order to be retroreflective. In either instance the color layer is disposed in the article so as to be in the path of light which is retroreflected by the resultant article. By "effective optical path" it is meant that the graphic pattern lies within the path taken by incident light that is retroreflected by the resultant article. In this manner, the graphic pattern imparts desired color to the light that is retroreflected.

Figure 3:
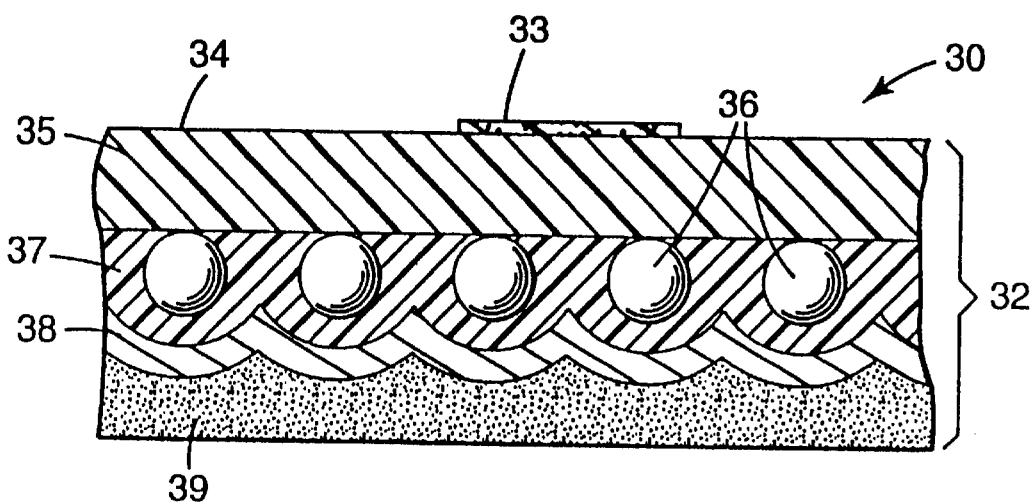
FIG. 3 is a schematic cross-sectional view of an enclosed-lens retroreflective graphic article having a graphic image of the invention formed thereon.

An illustrative embodiment of a signage or graphic article of the invention is illustrated in FIG. 3. Article 30 comprises retroreflective substrate 32 and graphic image 33 disposed on substrate front surface 34. Front surface 34 is the exposed surface of image receiving layer 35. Receptive substrate 32 comprises a monolayer of retroreflective elements 36 embedded in binder layer 37 with underlying reflecting layer 38. Such retroreflective base sheets are well known and disclosed in, for example, U.S. Pat. Nos. 4,664,966 (Bailey et al.) and 4,983,436 (Bailey et al.), both incorporated by reference herein. Illustrative examples of materials used in binder layer 37 include polyvinyl butyral and polyurethane alkyd. Graphic image 33 is formed from a composition of the invention. The particular formulation of a composition is preferably matched to the particular composition of image receiving layer 35 in order for image 33 to adhere thereto without the use of corona treatment or adhesion promoting prime layers. Article 30 also preferably comprises optional adhesive layer 39, which may have an optional liner thereon (not illustrated).

Figure 6:
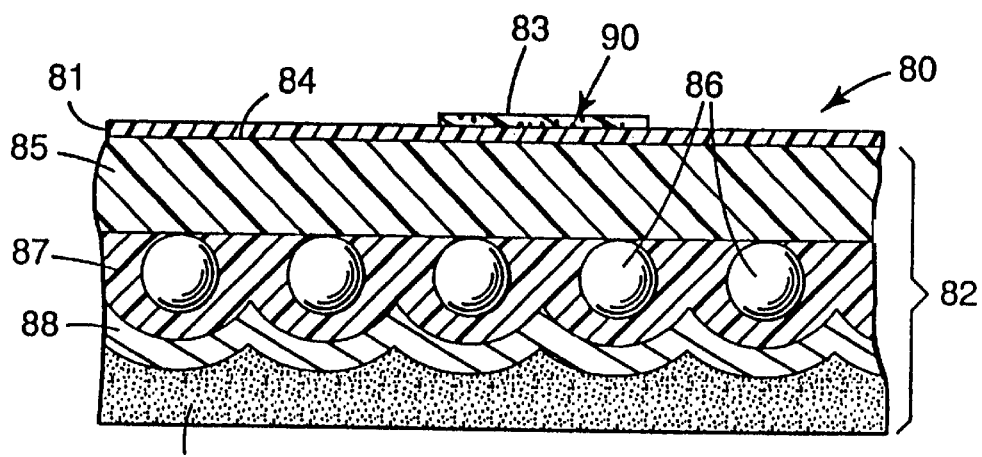
FIG. 6 is a schematic cross-sectional view of an enclosed-lens retroreflective graphic article having an image formed thereon, the image comprising a primer layer of a first crosslinkable binder, and a second layer of crosslinked binder containing colorant, with the second layer at least partially crosslinked to the first layer.

An illustrative embodiment of a signage or graphic article of the invention is illustrated in FIG. 6. Article 80 comprises retroreflective substrate 82 and graphic image 83 disposed on receptive substrate front surface 84. Front surface 84 is the exposed surface of layer 85. Graphic image 83 comprises layers 81 and 90. Layer 81 is a primer layer comprising, for example, a polyurethane, while layer 90 is the radiation crosslinkable composition of the invention. Layer 81 may also be an acrylic polymer, or a blend of acrylic and urethane polymers; the important requirement of the polymer selected for use as a primer is that it have a plurality of pendant ethylenically unsaturated moieties. Layer 81 may be applied in either an imagewise, discontinuous manner, or in a substantially uniform, continuous layer. Any suitable application method may be used, e.g., coating, lamination, and extrusion. Substrate 82 comprises a monolayer of retroreflective elements 86 embedded in binder layer 87 with underlying reflecting layer 88.

Layer 85 typically comprises a thermoplastic or thermoset transparent material that is preferably durable. Suitable thermoset materials (for use primarily for rigid, flat supports such as highway signs) are selected from the group consisting of alkyd resins and acrylic resins. Suitable thermoplastic materials include plasticized PVC, substantially thermoplastic polymers selected from (a) one or more aliphatic polyurethanes and (b) one or more copolymers of monomers comprising by weight a major portion of at least one of ethylene and propylene and a minor portion of an acid functional monomer such as acrylic acid, methacrylic acid and vinyl acetate, which copolymer has been crosslinked by cations such as zinc, sodium, or potassium. Zinc is preferred for weathering purposes. Such crosslinked copolymers are sometimes referred to as ionomers, including those known under the trade designation SURLYN™ (particularly 1706), from du Pont. The substantially thermoplastic polymers have weight average molecular weight of at least 60,000 and melt index no greater than 300, preferably no greater than 100, more preferably no greater than 20 (as measured in accordance with ASTM D 1238). Polymethylmethacrylate films (see Tung et al. U.S. Pat. No. 4,511,210) and biaxially oriented PET may be used for rigid, flat signs, but both require an additional pressure-sensitive adhesive (PSA) layer between layers 85 and 87, and thus are not as preferred. The PSA raises cost, and lies in the optical path and may degrade, thus reducing optical efficiency of retroreflective signage.

Another embodiment of a retroreflective sheeting of the invention (not illustrated) comprises an encapsulated-lens retroreflective substrate comprising a monolayer of retroreflective elements each comprising a glass microsphere having an aluminum reflective layer on the back side thereof partially embedded in a binder layer with an optional layer of adhesive on the back side thereof. The substrate also comprises a cover film disposed in front of the retroreflective elements typically sealed to the rest of sheet with a pattern of intersecting bonds. A number of encapsulated-lens retroreflective sheetings are known, for example, U.S. Pat. Nos. 4,025,159 (McGrath), 4,896,943 (Tolliver et al.), and 5,066,098 (Kult et al.), which are incorporated by reference herein. Illustrative examples of materials that may be used as cover films include polycarbonate polyethylene, polypropylene, copolymers of ethylene (e.g., ethylene acrylic acid copolymer), polymethylmethacrylates, and the like.

One, or more than one, graphic image may be present in a graphic article embodiment of the invention, as desired. An image may be continuous, i.e., cover substantially the entirety of the substrate surface, or may be discontinuous and cover only a portion of the image receiving layer of the substrate. If more than one image is provided in an article of the invention, such images may overlap in some portions in order to achieve additive color effects. When more than one image is used, the images may have substantially the same formulation, perhaps with only the colorant component being changed as necessary to achieve the desired color, or the formulations may be varied.

Figure 4:
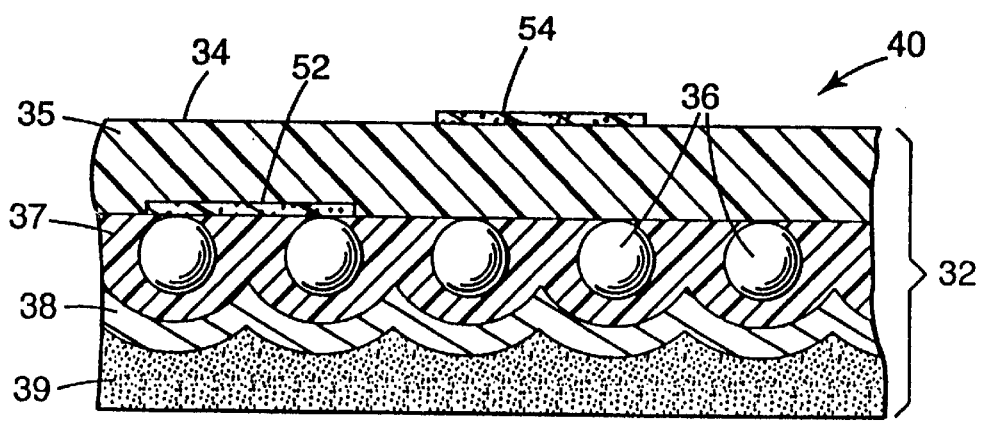
FIG. 4 is a schematic cross-sectional view of an enclosed-lens retroreflective graphic article having a first, embedded image of the invention and a second, exposed image of the invention.

FIG. 4 illustrates embodiment 40 substantially identical to embodiment 30 of FIG. 3 except that embodiment 40 comprises thermoplastic graphic image 52 embedded between cover film 35 and binder layer 37 and second thermoset graphic image 54 disposed on surface 34 of image receiving layer 35. Graphic image 54 is substantially thermoset upon exposure to radiation energy. In embodiments wherein a first image is to be embedded and a second image is to be exposed, the embedded image may or may not be crosslinked, as desired. Crosslinking of the composition forming the embedded image is advantageous, in that primer layers or physical treatments are not required to enhance adhesion of cover layer 35 to binder layer 37, although they may be employed. The exposed imaging composition is exposed to radiation sufficient to crosslink the composition forming the image in order to provide durability and weatherability (as those terms are defined herein).

As desired, graphic images in articles of the invention may be very thin, e.g., a dry thickness of less than about 2.5 micrometers (0.1 mil), or thick, e.g., a dry thickness of between about 10 to 50 micrometers (0.5 to 2.0 mils). As will be understood by those skilled in the art other thicknesses may be used if desired.

Crosslinking of the composition of the graphic image results in a substantially thermoset graphic image. Typically it is preferred that exposure to radiation results in no visually observable effect upon the image. Crosslinking may chemically couple the binder of the image composition to the image receiving layer of a substrate to which the composition is transferred, as described more particularly herein below.

Figure 5:
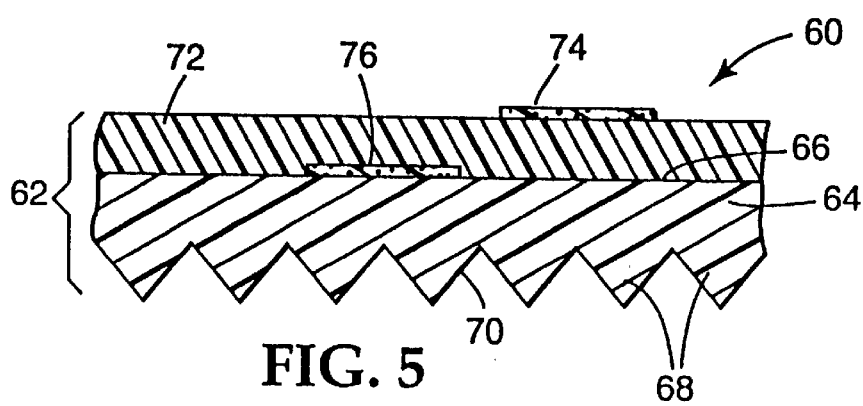
FIG. 5 is a schematic cross-sectional view of a cube corner retroreflective graphic article having a first, embedded image of the invention and a second, exposed image of the invention.

Another embodiment of a graphic article of the invention is illustrated in FIG. 5 wherein article 60 comprises retroreflective substrate 62 and thermoset graphic image 74 on the image receiving layer or front surface of cover sheet 72. Substrate 62 comprises cube-corner type retroreflective sheeting 64 with flat front surface 66 and a plurality of cube-corner elements 68 protruding from rear surface 70 thereof. Optional abrasion resistant cover sheet 72 is disposed on the upper surface of sheeting 64. Illustrative cube-corner type retroreflective sheetings are disclosed in U.S. Pat. Nos. 3,712,706 (Stamm), 4,243,618 (Van Arnam), 4,349,598 (White), 4,588,258 (Hoopman), 4,775,219 (Appledorn et al.), and 4,895,428 (Nelson et al.) all of which are incorporated by reference herein. Typically, cube-corner elements 68 will be encapsulated using a sealing film (not shown), such as is disclosed in U.S. Pat. No. 4,025,159 (McGrath) previously incorporated by reference. Graphic image 74 adhering to the front surface of cover sheet 72 is a substantially thermoset graphic image formed from a solid thermoplastic imaging composition as described herein above, preferably comprising a colorant, a minor portion of an acrylic copolymer, and an acrylated urethane crosslinked through pendant ethylenically unsaturated moieties.

In each of the inventive retroreflective graphic article embodiments illustrated herein, the graphic image is provided within the path taken by incident light that is retroreflected by the sheet. In this manner, the composition used to form the graphic image imparts desired color to light that is retroreflected. Advantageously, compositions of the invention are preferably visibly homogenous so that they may form graphic images on graphic articles that are highly transparent, which is useful for good retroreflective performance. High transparency is attained by maintaining similarity between the refractive indexes of all components of the composition of the invention.

Vinyl-based, solvent-borne color layers of known hot stamp foils typically require priming by special physical treatments or the use of an adherence layer when applied to ethylene acrylic acid cover films (see, for example, the aforementioned U.S. Pat. No. 5,393,590). The present invention provides graphic articles having graphic images formed without such prime treatments or adherence layers. However, it is recognized that imaging compositions of the invention do adhere to such primed or treated surfaces and may be transferred to such surfaces if desired.

Compositions of the invention are suitable for forming a graphic image on an image receiving layer of a receptive substrate by thermal transfer printing, thus forming a signage precursor. Such signage precursor may then be radiation crosslinked to form a signage article. In the context of this invention, thermal transfer printing generally refers to printing processes which transfer the inventive composition to an image receiving layer of a receptive substrate by application of heat and/or pressure. For example, the inventive composition may be transferred by means of resistive elements, hot stamps, ribbon-contacting elements in a laser system, electronic elements or inductive elements. Preferred means of transferring the inventive composition comprise thermal mass transfer printing systems (such as described in assignee's published Patent Cooperation Treaty application WO 94/19769, published Sep. 1, 1994) and hot stamp foil printing systems. The imaging composition adheres to at least a portion of the receptive substrate and generally forms an image thereon. The image may be variable or repeating alphanumeric characters, or may be a logo, design, graphic symbol, bar code and the like.

Alternatively, an imaging composition according to the invention may be used to make preformed images on a carrier by silk screening, flexographic printing, gravure printing, and the like. Such pre-formed images may be thermally transferred by hot transfer lamination, also known as "iron-on" transfer.

Crosslinking of the composition of the invention increases the cohesive strength of the image on the substrate. The increased cohesive strength increases the durability, weatherability, solvent resistance and abrasion resistance of the resulting substantially thermoset graphic image. The advantages of thermally transferring color layers in an uncrosslinked state and then subsequently crosslinking (e.g., latently crosslinking) the color layer after thermal transfer to a receptive substrate were not recognized heretofore. Although it was known that durability, weatherability and the like were enhanced by increased cohesive strength, the thermal mass transfer efficiency (i.e., the amount and ease of composition transferred) of high cohesive strength imaging compositions was generally poor since they tend to adhere to the carrier. Typical imaging compositions were formulated with a lower cohesive strength and durability was achieved after thermal transfer by providing a protective clear coat or cover film over the graphic image. In contrast, the inventive thermoplastic compositions described herein have low cohesive strength for efficient thermal mass transfer and increased cohesive strength after thermal mass transfer and crosslinking to provide good durability. Moreover, compositions according to the invention confer improved durability on graphic articles, compared to known graphic articles using known imaging compositions.

A graphic article having an image may be formed according to the invention by steps comprising: contacting an imaging composition of the invention (preferably supported on a removable carrier) to the image receiving surface of a receptive substrate, forming the graphic image by transferring at least a portion of the composition to the image receiving surface of a receptive substrate, removing any carrier used, and exposing the transferred composition to radiation energy sufficient to crosslink the acrylated urethane therein. Thermal transfer may be carried out by printing means such as thermal mass transfer or hot stamping, described above. A graphic article may itself be attached to additional components before or after forming an image thereon, e.g., a reflective sheeting may be attached to an embossed aluminum license plate, and images formed by hot stamping the raised portions. In another embodiment, an image is formed on a receptive polymeric top film. The image-bearing side of the resulting graphic article is subsequently laminated to a retroreflective base sheet thus embedding the image. Crosslinking of the colored image may or may not be activated, as desired.

Another advantage of the compositions of the present invention is that durability, solvent resistance, weatherability and the like can be more readily provided in small "made-to-order" production runs of graphic articles, since a top film is not needed to protect the image. Compositions of the invention can be incorporated in inventive thermal mass transfer ribbons that are useful for forming durable, variable information indicia on receptive substrates, preferably retroreflective substrates. Variable information indicia can be formed on such articles and the composition in the indicia subsequently crosslinked to a substantially thermoset state. Such crosslinked indicia need not have a clear coat or top film applied thereover, as is the case for indicia formed by many known thermal transfer imaging compositions.

The production of graphic articles is thereby made much more convenient, particularly the production of small numbers of variable information articles. For example, license plates can have item-specific images formed by not stamping in dispersed locations without the need for such locations to have clear coating or laminating equipment and facilities. Variation in the images formed on an article need not be a regular incremental change in an alphanumeric sequence. Instead, images may be varied in an item-specific manner, for example, by selecting article-specific images immediately prior to printing such images upon an article. Article-specific images may be generated based upon desired input criteria, such as registration status, name of individual requesting a printed article, printing date, expiration date, product number, warehouse location and the like. Combinations of criteria may be used also, and/or separate criteria may be used to form sub-elements of the formed indicia.

Bar-coded labels or stickers often are used to identify and maintain appropriate levels of inventory, for example, in a warehouse or distribution center. In addition to the use of labels for inventory control, durable and/or weatherable articles constructed from polymeric sheetings of the invention may also be frangible, in order to inhibit theft and/or transfer of labels from one item or package to another item or package. Security also may be enhanced by forming some portions of the variable information in a random or otherwise unpredictable manner. Randomized variable information images for labeled packages then may be maintained in a secure central information storage system to inhibit fraud or theft.

The invention is further described with reference to the following test methods and examples wherein all parts and percentages are by weight unless otherwise specified. A composition or graphic article that fails to pass every test may still be useful for certain purposes; depending upon the requirement of a specific application.

TEST METHODS

Adhesion

Adhesion of an exposed graphic image was evaluated by the following test procedure, which is analogous to ASTM D 3359. A series of 11 parallel lines each 1 millimeter (mm) apart were scored on the surface of the image. A second series of 11 parallel lines, each 1 mm apart and perpendicular to the first set were scored to create a grid of 100 squares each measuring about 1×1 mm. Each line was sufficiently deep to fully penetrate the image without injury to the underlying receptive surface. Olive Drab Cloth Tape No. 390 (Minnesota Mining and Manufacturing Company, St. Paul, Minn.) was firmly adhered to the grid with a plastic squeegee blade, and then removed in a rapid, single, continuous motion by pulling at an angle of about 90° relative to the panel. Percent adhesion was measured as the number of squares remaining adhered divided by the number of original squares and the result multiplied by 100. Percent adhesion was preferably 95 percent, more preferably 100 percent.

Adhesion of embedded graphic images may be evaluated by slicing with a new razor blade at about a 20° to 30° angle to the sample in order to slice away a 0.5 to 1.0 centimeter portion of the overlying cover film and to cut through the underlying substrate. The separated cover layer is then peeled away from the image at about 150° to 180°. The cover layer is further peeled away until it peels from the image (or the image peeled free from the underlying substrate) until one side of the panel is peeled along its entire length. If a peel is not successfully completed after the razor blade slice, the razor blade is turned over and another attempt made. If that also fails, a new razor blade is used and the peel attempted again. This sequence is repeated up to 10 times if necessary.

One piece of filament tape is then adhered to the peeling top film and another to the substrate, and these pieces of tape inserted into opposing jaws of a tensile testing machine known under the trade designation INSTRON™. The tensile tester is then set at a jaw separation speed of 12.5 centimeters/minute and the average peel force measured. If the peel can not be started during preparation of the sample, the peel test is denoted as "CP" for the base sheet. If a peel could be started, the peel force is preferably at least 9 Newtons, more preferably at least 18 Newtons.

Solvent Resistance

Solvent resistance of the thermally transferred compositions was tested by wiping a paper towel moistened with methyl ethyl ketone (MEK) across the exposed graphic image with successive double rubs and counting the number of double rubs required to remove the image from the substrate surface.

Abrasion Resistance

Abrasion resistance may be tested by a procedure analogous to ASTM D 968.

EXAMPLES

Compositions for the thermal transfer color layers described in Examples 1 and 2 were prepared by coating the composition onto polyethyleneterephthalate (PET) film using a wire wound bar and drying at room temperature. Hot stamp foils may be produced by coating onto 1.5 mil (0.038 mm) thick PET film, with a nominal wet film thickness of 0.5 mil (0.0127 mm). Thermal mass transfer ribbons may be produced by coating onto 5 micrometer thick precoated PET films having a heat-resistant composition on the back (non-colored) surface.

The use of hot stamp foils may be demonstrated using a retroreflective sheeting laminated to an aluminum or steel license plate blank, embossed with the desired alphanumeric graphic to a desired depth typically 10 cm. The heated roll of the hot stamp machine is set at about 210° C., and transfer to the embossed graphic occurs at a rate of about 0.1 m/sec.

Retroreflective sheetings containing buried graphics can be formed using compositions of the invention; the graphic image is printed directly onto a 1.3 mil (0.033 mm) thick ethylene acrylic acid (EAA) film, then laminated, image side down, onto a retroreflective base sheet. The retroreflective base sheet may be an enclosed lens product with a cover layer of polyvinyl butyral, or any of the other retroreflective sheetings described herein.

Example 1

A composition of the invention was prepared by mixing 25 to 30 grams (g) of a EAA/carbon black mixture, 70 to 75 g of a waterborne UV-curable urethane polymer (NEORAD™ NR-440) and 1.5 g of a photoinitiator (DAROCUR™ 1173, from Ciba-Geigy, Ardsley, N.Y.). The EAA/carbon black mixture was produced by mixing 95 g of a waterborne EAA dispersion (ADCOTE™ 50T4990, from Morton International) and 5 g of an aqueous, surfactant-stabilized dispersion of carbon black pigment (Aqualour™ Black, Penn Color) for 5 minutes with a propeller mixer.

The compositions were coated onto PET support film using a wire wound bar at a wet film thickness of about 13 micrometers and dried for 1 day at room temperature (about 20° C.).

The resulting thermal transfer article was then loaded into a hot stamp machine operating at 5 to 6 feet/minute and 200° C. The color layer was then transferred imagewise onto an embossed license plate with a piece of an enclosed lens retroreflective sheeting having an extruded EAA cover film as described in U.S. Pat. No. 4,664,966 to form a graphic article.

The transferred solid residue of the imaging composition of the invention had good adhesion to the substrate, as demonstrated by the cross-hatch tape snap adhesion test; however, the solvent resistance test indicated that the graphic image was easily removed from the substrate.

Example 2

A second graphic article was prepared exactly as described above in Example 1 except that the article was UV irradiated after transfer of the imaging composition by 1 pass at about 250 mj/cm$^2$ in air. Again, the transferred solid residue of the imaging composition of the invention had good adhesion to the substrate, as demonstrated by the cross-hatch tape snap adhesion test. In Example 2 however the solvent resistance test indicated that 100 double rubs failed to remove any of the graphic image from the substrate. The increased solvent resistance of the UV-irradiated article compared to the non-irradiated article demonstrated that UV-activated crosslinking had taken place.

Examples 1 and 2 demonstrated the surprising result that crosslinkable thermal transfer articles of the invention can be easily fabricated and remain thermally transferable. Furthermore, the color layer of the thermal transfer article was crosslinkable after thermal transfer (e.g., latently crosslinkable), as demonstrated by the improved solvent resistance of the transferred color layer after a post-transfer cure.

Various modifications and alterations of this invention will become apparent to those skilled in the art without departing from the scope of the claims.

What is claimed is:

1. A graphic article comprising:
    a) a substrate having a polymeric surface layer; and
    b) a graphic image adhered to at least a portion of said polymeric surface layer, said graphic image comprising:
        i) a first layer adhered to the polymeric layer, said first layer comprising a first crosslinkable binder; and
        ii) a colorant layer adhered to said first layer, said colorant layer comprising a colorant and a second radiation-crosslinked binder which is at least partially crosslinked with said first crosslinkable binder.
2. The article of claim 1 wherein the substrate comprises retroreflective elements.
3. The article of claim 1 wherein the first covalently radiation-crosslinked thermoset binder is a polyurethane.
4. The article of claim 1 wherein both the first and second crosslinked binders are polyurethanes.
5. The article of claim 1 wherein said polymeric layer comprises polymethylmethacrylate.
6. The article of claim 1 wherein said polymeric layer comprises materials selected from the group consisting of polyvinyl butyral, melamine alkyd/urethane, polymethylmethacrylate, polyvinyl chloride, melamine crosslinked urethane and ethylene copolymer.
7. The article of claim 6 wherein said ethylene copolymer is a copolymer of ethylene and acrylic acid.

* * * * *